UNITED STATES PATENT OFFICE.

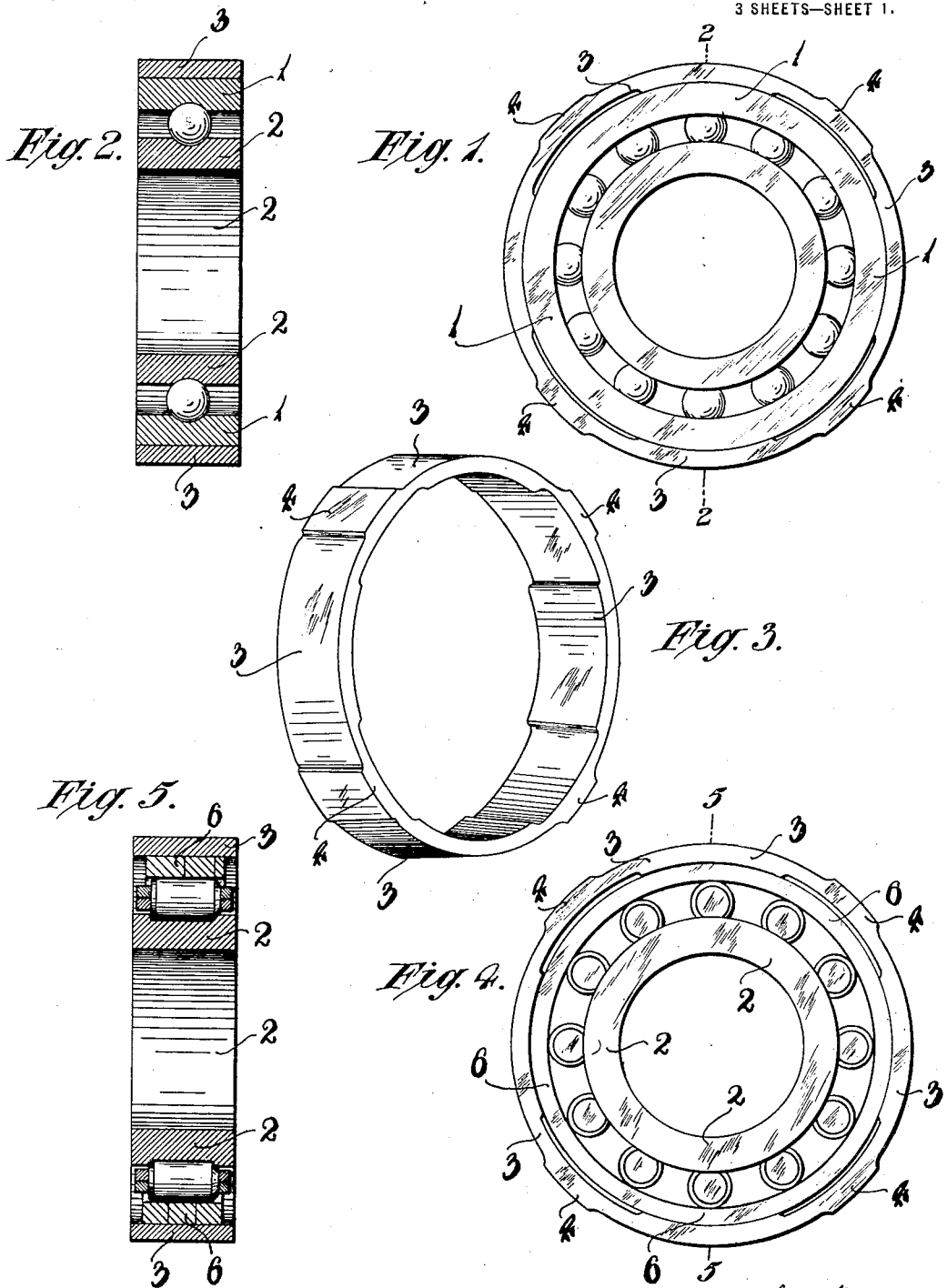

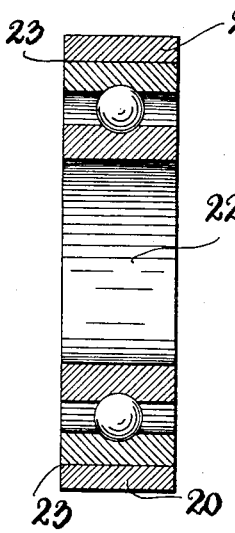
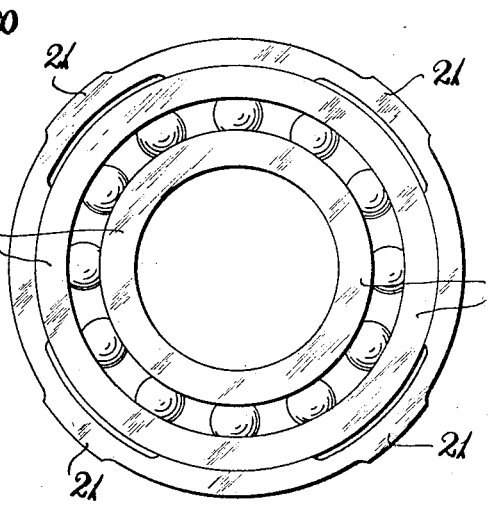
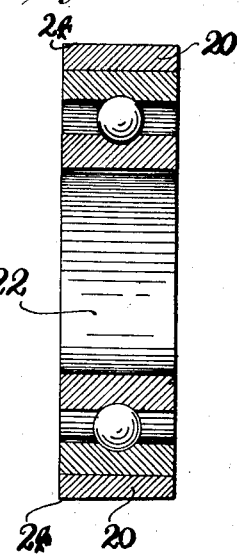
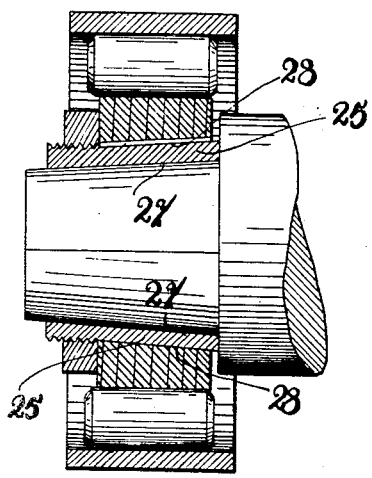
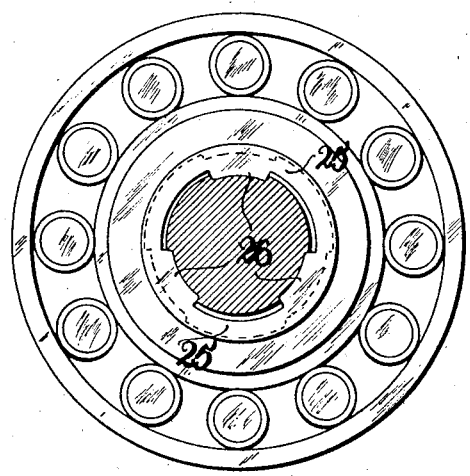

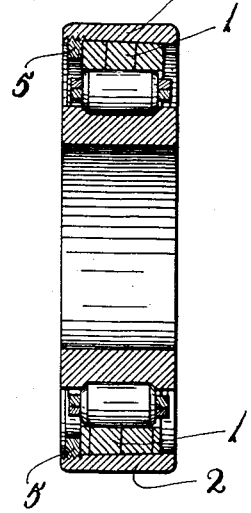
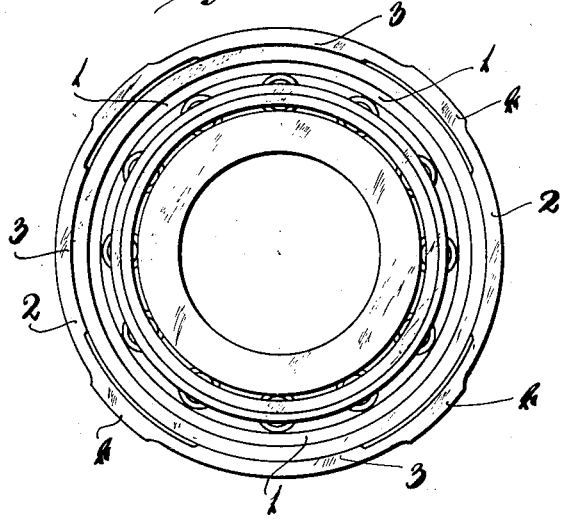
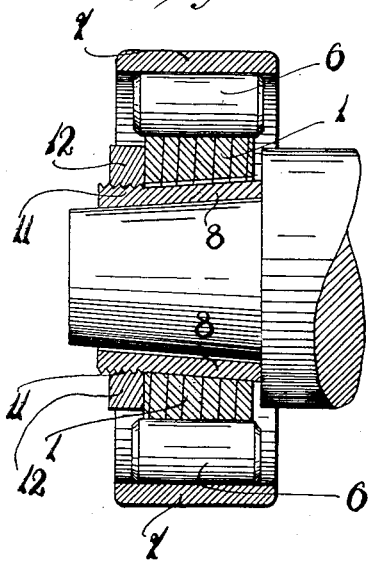
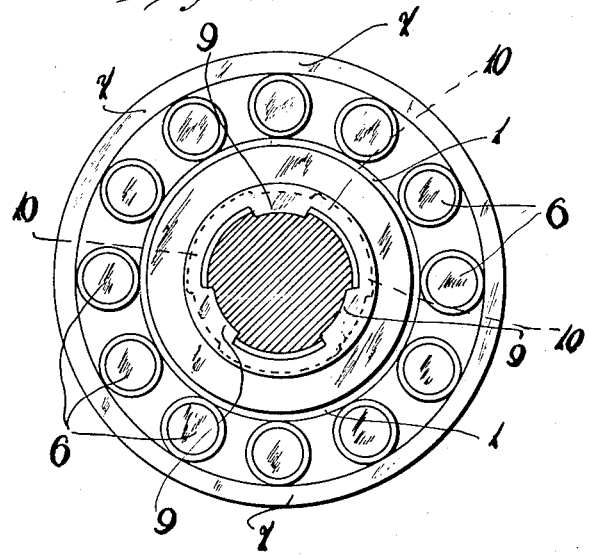

ALFRED HAROLD HINDLE, OF BIRMINGHAM, AND STANLEY WHITBY SAVAGE, ALBERT EDWARD DABBS, AND ABSALOM LIDDLE, OF MANCHESTER, ENGLAND, ASSIGNORS OF ONE-HALF TO JOHN GEORGE WILLIAM GRUBAN, OF LONDON, ENGLAND.

ROLLER, BALL, AND OTHER BEARING.

1,386,255.  Specification of Letters Patent.  Patented Aug. 2, 1921.

Application filed April 29, 1919. Serial No. 293,552.

*To all whom it may concern:*

Be it known that we, ALFRED HAROLD HINDLE, STANLEY WHITBY SAVAGE, ALBERT EDWARD DABBS, and ABSALOM LIDDLE, subjects of the King of Great Britain, residing at 51 Sandford road, Moseley, Birmingham, in the county of Warwick, England; 55 Brook road, Chorlton-cum-Hardy, Manchester, in the county of Lancaster, England; 19 Rowan avenue, Whalley Range, Manchester, aforesaid, and 3 King's road, Alexandra road south, Manchester, aforesaid, respectively, have invented a new and useful Improvement in Roller, Ball, and other Bearings; and we do hereby declare the following to be a full, clear, and exact description of the same.

Our invention relates to improvements in roller, ball and other bearings of the type in which provision is made, irrespective of compressibility of metal or material, for the desired amount of resilience in the outer or inner race or both outer and inner races.

It has already been proposed to obtain this resilience by means of a coiled or spirally formed race held in suspension in its housing by end spigots which enter the bore.

According to one form of the present invention in ball, roller or other bearings we provide two sets of distance pieces arranged in staggered relation upon the interior and exterior of a ring, each set consisting of a number of distance pieces arranged longitudinally with spaces between each two distance pieces, all of said spaces extending from one edge of the ring to the opposite edge.

The distance pieces may be formed integral with the rings or they may be made separately, or one set of distance pieces may be upon one side of a ring and another set may be upon another ring fitting into or around the first mentioned ring.

One of the difficulties associated with the use of rings provided with staggered distance pieces, is the difficulty of fitting such rings accurately into their housings or on to their shafts, or in making other members of the bearings fit accurately into said rings and with the object of overcoming this difficulty we may slightly taper either the exterior or the interior or both surfaces of such rings, whereby such rings can be assembled in a bearing with much less difficulty than is the case with a parallel ring.

This invention has for a further object to provide a simple means whereby a radial adjustment of such bearings can be effected.

According to this part of the present invention we employ the combination of a ring having staggered distance pieces and a coiled or spirally formed member with means for applying radial pressure thereto whereby the diameter of the coiled or spirally formed member can be adjusted as desired.

Referring to the drawings:—

Figure 1. illustrates in elevation a ball bearing in accordance with this invention.

Fig. 2. is a section at 2—2 in Fig. 1.

Fig. 3. is a perspective view of the ring removed.

Fig. 4. is a similar view to Fig. 1 illustrating a modified form of the invention applied to a roller bearing.

Fig. 5. is a section at 5—5 in Fig. 4.

Figs. 6 and 7. show in sectional side elevation and end elevation respectively another form of the invention.

Fig. 8, is a similar view to Fig. 1 showing another construction.

Figs. 9 and 10. show in sectional side elevation and end elevation respectively, another form of the invention.

Figs. 11 and 12. show in sectional side elevation and end elevation respectively another form of the invention.

Figs. 13 and 14 show in sectional side elevation and end elevation respectively another form of the invention.

In carrying our invention into practice as illustrated upon the accompanying drawings at Figs. 1–3 the outer and inner ball race members 1 and 2 are of usual construction, but having a ring 3 of slightly greater internal diameter than the external diameter of the outer ball race concentrically disposed around the outer periphery of the ball race member. The said ring is provided with distance pieces 4 arranged at intervals around its outer periphery, those on the inner periphery engaging the outer ball race member and those on the outer periphery with the housing of the bearing (not shown).

The distance pieces have a staggered relation and may be formed on the ring as shown.

In another form the ball race or shaft may be surrounded by a comparatively broad but thin metal ring, a second ring being placed concentrically outside the first one, the second ring having an internal diameter slightly greater than the external diameter of the inner ring. Between these two rings distance pieces are disposed.

Any suitable number of these distance pieces may be employed, three or four being convenient numbers. The outer surface of the outer ring is formed with similar distance pieces which fit within the housing of the bearing, these distance pieces being arranged midway between the distance pieces on the inner ring. The thickness of each of the rings between the distance pieces is such as to allow a certain amount of flexibility and owing to the staggered relation of the distance pieces it will be obvious that this resiliency is obtainable at any point around the bearing, being given by the inner ring in positions between the inner ring distance pieces and being given by the outer ring at points corresponding with the inner ring distance pieces.

In a modification of the invention shown in Figs. 4 and 5 the inner race 2 is of usual form while the outer race 6 is coiled or spirally formed. The ring 3 is similar to that previously described with reference to Figs. 1–3.

In the constructions shown in Figs. 6, 7 and 8 wherein a ring 20 having staggered distance pieces 21 on its exterior and interior surfaces is associated with an ordinary ball bearing 22, the ring 20 is slightly tapered on its interior surface at 23 (Fig. 6) or exterior surface at 24 (Fig. 8) or both, whereby the ball bearing can be pushed into said ring without difficulty and the ring can be fitted into its housing without difficulty.

In the construction shown in Figs 9 and 10 wherein the ring 25 having staggered distance pieces 26 forms the inner member of the bearing, either the internal surface 27 of said ring may be slightly tapered as shown, so that it may be pushed on to a shaft without difficulty or the exterior surface 28 of the ring may be tapered to facilitate the fitting of the adjacent bearing member.

The degree of tapering contemplated is about 2½ degrees.

It will be understood that rings formed according to the present invention and having slightly tapered surfaces can be used in conjunction with either correspondingly tapered parts or with parallel members.

In the construction illustrated in Figs. 11 and 12 the exterior surface of the coiled or spirally formed member 11 is tapered and this member is used in combination with a ring 12 which is correspondingly tapered at its interior surface, means being provided for moving the coiled or spirally formed member axially with respect to the ring 12. The ring 12 is of the type hereinbefore described having staggered distance pieces 13 and 14 upon its opposite surfaces. The axial adjustment is obtained by a ring 15 which is screwed in the outer ring 12 and bears against the larger end of the coiled or spirally formed member 11.

In the construction illustrated in Figs. 13 and 14 a spirally formed member 10 forms the inner race for the ring of rollers or balls 60. This ring of rollers or balls is contained within a housing such as 70. The interior surface of the spirally formed member 10 is tapered as shown and within the member 10 fits a tapered ring 80 provided with staggered distance pieces 90 and 100 upon its opposite surfaces. The member 80 is provided with a screw threaded portion 110 upon which screws a ring 120 bearing against the larger end of the member 10. The ring 120 is provided for the purpose of obtaining adjustment of the member 10 or forcing it over the tapered part of the member 80.

It will be understood that my invention is applicable to plain bearings in addition to roller and ball bearings. When the invention is applied to plain bearings the construction is similar to that shown in the drawings with the rings of rollers omitted and the spirally formed member fitting between the inner and outer rings.

What we claim then is:—

1. A bearing having a single resilient element adapted to receive and transmit pressure from the shaft, a plurality of distance pieces on the interior of the element extending continuously from one edge of the element to the opposite edge and forming between them spaces extending continuously from one edge to the opposite edge, and a plurality of distance pieces upon the exterior of the said element extending continuously from one edge of the element to the opposite edge in staggered relation to those on the interior thereof and forming between them spaces which extend continuously from the one edge to the opposite edge.

2. A bearing having a single resilient element adapted to receive and transmit pressure from the shaft, two rings between which are arranged a plurality of rotary members, a plurality of distance pieces on the interior of the element extending continuously from one edge of the element to the opposite edge and forming between them spaces extending continuously from one edge to the opposite edge, and a plurality of distance pieces upon the exterior of the said element extending continuously from one edge of the element to the opposite edge in staggered relation to those on the interior thereof and forming between them spaces which extend continuously from the one edge to the opposite edge.

3. A bearing having a single resilient element adapted to receive and transmit pressure from the shaft, a ring and a spirally coiled member between which are arranged a plurality of rotary members, a plurality of distance pieces on the interior of the element extending continuously from one edge of the element to the opposite edge and forming between them spaces extending continuously from one edge to the opposite edge, and a plurality of distance pieces upon the exterior of the said element extending continuously from one edge of the element to the opposite edge in staggered relation to those on the interior thereof and forming between them spaces which extend continuously from the one edge to the opposite edge.

4. A bearing having a single resilient element adapted to receive and transmit pressure from the shaft and having a tapered interior surface, a plurality of distance pieces on the interior of the element extending continuously from one edge of the element to the opposite edge and forming between them spaces extending continuously from one edge to the opposite edge, and a plurality of distance pieces upon the exterior of the said element extending continuously from one edge of the element to the opposite edge in staggered relation to those on the interior thereof and forming between them spaces which extend continuously from the one edge to the opposite edge.

5. A bearing having a single resilient element adapted to receive and transmit pressure from the shaft and having a tapered interior surface, two rings between which are arranged a plurality of rotary members, a plurality of distance pieces on the interior of the element extending continuously from one edge to the opposite edge and forming between them spaces extending continuously from one edge to the opposite edge, and a plurality of distance pieces upon the exterior of the said element extending continuously from one edge of the element to the opposite edge in staggered relation to those on the interior thereof and forming between them spaces which extend continuously from the one edge to the opposite edge.

6. A bearing having a single resilient element adapted to receive and transmit pressure from the shaft and having a tapered interior surface, a ring and a spirally coiled member between which are arranged a plurality of rotary members, a plurality of distance pieces on the interior of the element extending continuously from one edge of the element to the opposite edge and forming between them spaces extending continuously from one edge to the opposite edge, and a plurality of distance pieces upon the exterior of the said element extending continuously from one edge of the element to the opposite edge in staggered relation to those on the interior thereof and forming between them spaces which extend continuously from the one edge to the opposite edge.

In testimony whereof we affix our signatures.

ALFRED HAROLD HINDLE.
STANLEY WHITBY SAVAGE.
ALBERT EDWARD DABBS.
ABSALOM LIDDLE.